United States Patent [19]

Fitzgerald

[11] 4,318,035
[45] Mar. 2, 1982

[54] SIDE PINCUSHION CORRECTION CIRCUIT

[75] Inventor: William V. Fitzgerald, Indianapolis, Ind.

[73] Assignee: RCA Corporation, New York, N.Y.

[21] Appl. No.: 119,963

[22] Filed: Feb. 8, 1980

[51] Int. Cl.³ .............................................. H01J 29/70
[52] U.S. Cl. .................................. 315/387; 315/371; 315/400
[58] Field of Search .................... 315/400, 371, 387

[56] References Cited

U.S. PATENT DOCUMENTS

| | | |
|---|---|---|
| 3,329,862 | 7/1967 | Lemke . |
| 3,408,535 | 10/1968 | Lemke . |
| 3,946,274 | 3/1976 | Dietz ............................... 315/371 |
| 3,968,402 | 7/1976 | Sahara et al. ................... 315/400 X |
| 3,982,156 | 9/1976 | Monroe ........................... 315/400 |
| 4,093,895 | 6/1978 | Collette ......................... 315/400 X |
| 4,118,656 | 10/1978 | Dietz ............................... 315/371 |

OTHER PUBLICATIONS

Main Chassis Schematic Diagram for GE EC-A Color Television Receiver, vol. N, (EC)4-9, 10/79.

pp. 23, 24, 25 of RCA Television Service Data Pamphlet No. 1979 C-5, Entitled "Chassis CTC 96 Series".

*Primary Examiner*—Malcolm F. Hubler
*Attorney, Agent, or Firm*—William H. Meagher; Eugene M. Whitacre; Paul J. Rasmussen

[57] ABSTRACT

In a color television receiver, field rate sawtooth current waves are supplied to vertical deflection windings by a vertical deflection output amplifier. The series combination of a deflection current sampling resistor and a DC blocking capacitor, coupled between the low potential terminal of the vertical deflection windings and a point of reference potential, is traversed by the field rate sawtooth current waves. The voltage across the series combination, comprising the sum of a field rate sawtooth voltage component and a field rate parabolic voltage component, is used as the drive voltage for the input winding of a saturable reactor effecting side pincushion distortion correction. The deflection current representative voltage developed by the sampling resistor is also utilized for a linearizing feedback purpose. The capacitor also serves a filtering function for the energizing potential supplied to the output amplifier.

6 Claims, 1 Drawing Figure

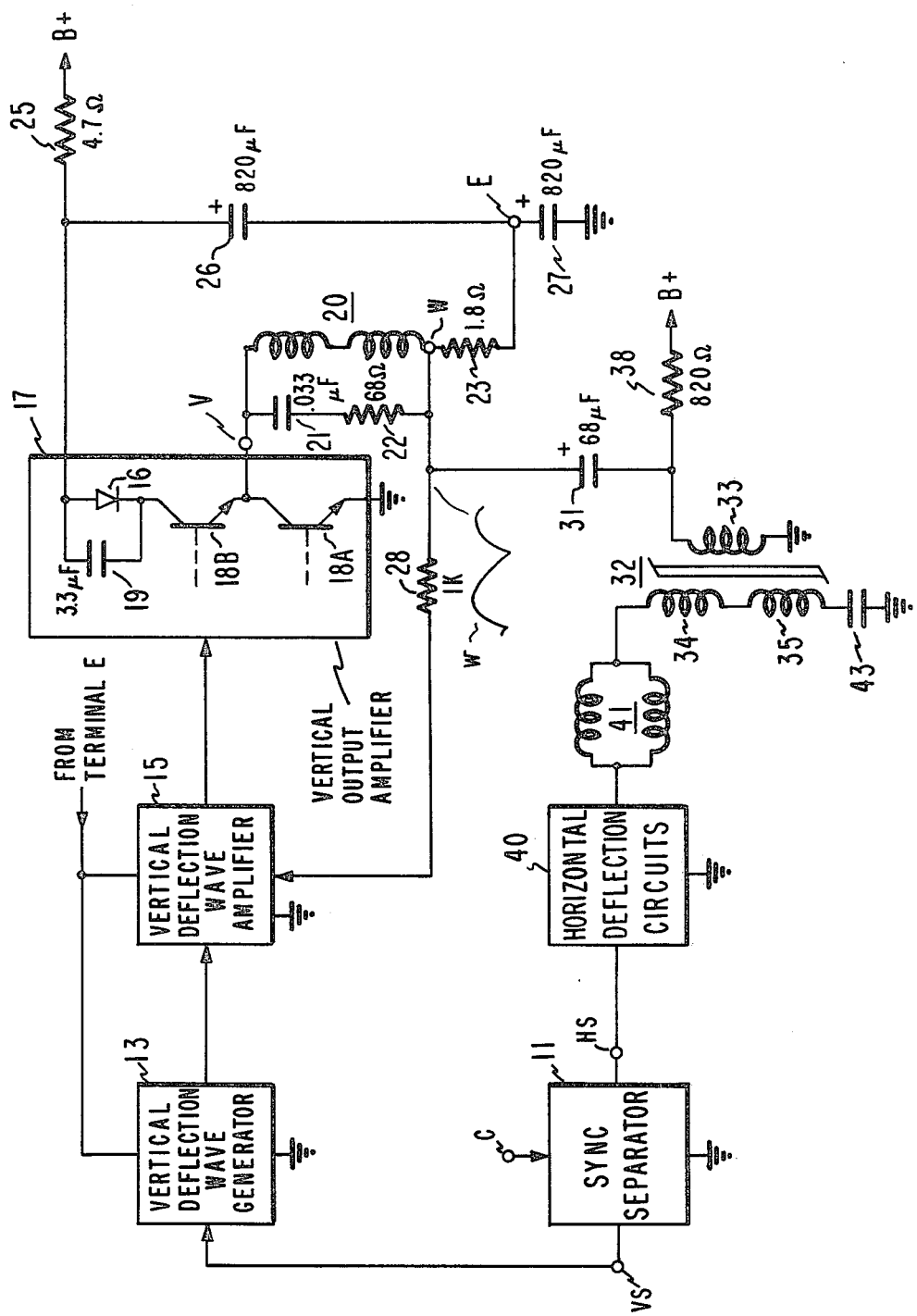

SIDE PINCUSHION CORRECTION CIRCUIT

The present invention relates generally to circuits for correcting undesired distortion of the scanning raster of a cathode ray tube, and, in particular to novel circuitry of advantageous simplicity for use in correcting raster distortion of the so-called side pincushion type, as encountered for example in the operation of color kinescopes.

Raster distortion of the side pincushion type is characterized by the width of the raster varying from top to bottom in a substantially parabolic manner, with minimum width at the picture middle and maximum width at both top and bottom. A well-known approach to correction of side pincushion distortion involves employment of a saturable reactor as a dynamic width control, introducing compensating width variations from raster top to raster bottom in order to produce a corrected raster with essentially straight sides. Examples of side pincushion correction circuits employing the saturable reactor approach appear, for example, in U.S. Pat. No. 3,329,862—Lemke and U.S. Pat. No. 3,408,535—Lemke.

In use of the saturable reactor approach to side pincushion correction, it is desired to provide the input winding of the saturable reactor with a current that varies substantially parabolically at the field rate of the raster scanning system.

The present invention is directed to a side pincushion correction circuit of the saturable reactor type wherein drive for the input winding of the reactor is provided by relatively simple circuitry and in a manner avoiding undesirable power losses in the vertical deflection circuitry. In accordance with an illustrative embodiment of the present invention, the drive voltage for the input winding of the side pincushion correction reactor is developed across the series combination of a resistor and a capacitor disposed in the portion of the vertical scanning current path returning the low potential side of the vertical deflection yoke windings to a point of reference potential (e.g., ground). The resistor and capacitor elements of this type voltage generator also serve additional functions in the vertical deflection circuit, with the resistor serving as a current sampling resistor for developing a voltage representative of the scanning current for a linearizing feedback purpose, and with the capacitor serving a DC blocking function in the vertical output circuit, as well as serving a filtering function for an energizing potential supply to the vertical deflection circuits.

The voltage developed across the series combination of the current sampling resistor and the DC blocking/filter capacitor appears as the sum of a field rate sawtooth voltage component (developed across the resistor) and a field rate parabolic voltage component (developed across the capacitor). The combination waveform has a shape appropriate for application across the reactor input winding to produce the desired input winding current waveform; this is so because the reactor input winding exhibits an impedance having both a significant resistive component and a significant inductive component at the energizing field frequency.

A circuit arrangement in accordance with the present invention avoids extra power losses that are associated with the integrating action required in development of a suitable reactor drive voltage when the reactor input voltage is sought to be derived from the voltage appearing at the high potential terminal of the vertical deflection yoke windings (an approach employed, for example, in the RCA CTC 96 color television receiver chassis, described in the RCA Television Service Data Pamphlet No. 1979 C-5).

In the accompanying drawing, the sole FIGURE illustrates, partially schematically and partially by block representation, deflection circuitry of a color television receiver in which side pincushion distortion correction is effected in accordance with an embodiment of the present invention.

In the illustrated receiver circuit arrangement, composite video signals are supplied to the input terminal C of a sync separator 11, which develops separated horizontal and vertical synchronizing pulse waveforms at respective output terminals HS and VS. The horizontal synchronizing pulses appearing at terminal HS are supplied to horizontal deflection circuits 40 to synchronize the development therein, in a conventional manner, of suitable horizontal deflection waveforms. The output load for the horizontal deflection circuits 40 is shown in schematic detail as comprising the paralleled horizontal deflection windings 41 of the receiver's deflection yoke, which are connected in series with the output windings 34, 35 of a saturable reactor 32 and a retrace capacitor 43. The deflection circuits 40 cause a horizontal deflection current of a substantially sawtooth line rate waveform to flow through these series connected elements.

For side pincushion correction purposes, it is desired that the impedance presented by the reactor output windings 34, 35 to the flow of the line rate current waves vary at the field rate in a substantially parabolic manner, with the sense of the parabolic impedance variation being such as to reduce the line rate sawtooth wave magnitude at picture top and bottom relative to picture middle. The manner in which such an impedance variation is effected in the illustrated arrangement will be now explained by consideration of the illustrated vertical deflection circuitry and the coupling thereof to the input winding 33 of the saturable reactor 34.

The vertical synchronizing pulses appearing at terminal VS are supplied to a vertical deflection wave generator 13 to synchronize the development therein of a field rate deflection waveform. The field rate wave output of generator 13 is supplied to a vertical deflection wave amplifier 15 for amplification therein and delivery to a vertical output amplifier 17. For deflection linearization purposes, a feedback voltage representative of the output current waveform is also supplied to amplifier 15 with a sense opposing departures of the output current waveform from the desired waveshape. The development of such feedback voltage will be subsequently explained.

The vertical output amplifier 17 is illustrative of push-pull form, and may, for example, be of the type described in my copending U.S. Patent application Ser. No. 118,120 entitled "Vertical Deflection Circuit". For illustration purposes, the circuitry of amplifier 17 is shown in partial schematic detail as including a pair of stacked output transistors 18A and 18B, of NPN type, with the emitter of transistor 18A grounded, with the collector of transistor 18B connected to a point of positive operating potential (B+) via the series combination of a diode 16 and a decoupling resistor 25, and with the collector of transistor 18A and the emitter of transistor 18B jointly connected to an output terminal V. The poling of the diode 16 is such that its cathode is connected to the collector of transistor 18B, and its anode is connected via resistor 25 to the B+ terminal. A retrace capacitor 19 shunts the diode 16.

The output load for the amplifier 17 includes, in series, (a) the serially connected vertical deflection windings 20 of the receiver's deflection yoke, (b) a deflection current sampling resistor 23, and (c) a DC blocking electrolytic capacitor 27. The circuit elements (a), (b) and (c) are serially connected, in the order named, between the output terminal V and ground. The series combination of a resistor 22 and a capacitor 21 is shunted across the serially connected windings 20, these shunt elements serving a conventional function of damping line rate components undesirably coupled to windings 20 from the horizontal yoke windings.

An electrolytic capacitor 26 is coupled between the junction of resistor 25 and diode 16 and the junction of resistor 28 and capacitor 27. With this coupling effected, capacitor 27 cooperates with capacitor 26 to effect an operating potential filtering function in an advantageous manner, as explained in U.S. Pat. No. 3,784,857—Christopher. The DC potential developed across capacitor 27 during operation of the circuit is supplied as an energizing potential for the devices of generator 13 and amplifier 15.

The potential developed across the series combination of resistor 28 and capacitor 27 and appearing at the low potential terminal W of the vertical deflection windings 20 is supplied via a resistor 28 to amplifier 15 as the aforementioned linearizing feedback voltage (in a manner akin to that employed in the aforementioned RCA CTC-96 color TV receiver chassis).

Pursuant to the principles of the present invention, the potential appearing at terminal W also serves as the drive voltage for the input winding 33 of the side pincushion correcting reactor 32. For this purpose, a coupling capacitor 31 is connected between terminal W and one end terminal of input winding 33, and the other end terminal of input winding 33 is grounded. Capacitor 31 blocks the flow of direct current from terminal W, but presents a low impedance to the AC component of the field rate voltage waveform "w" developed across the series combination of resistor 28 and capacitor 27. As illustrated, waveform "w" has a waveshape corresponding to the sum of a field rate sawtooth voltage wave (as developed across sampling resistor 28 by the flow of the vertical deflection current therethrough) and a field rate parabolic voltage wave (as developed across blocking capacitor 27 by the flow of vertical deflection current therethrough). Application of a drive voltage of such a composite waveshape across input winding 33 produces field rate variations of the input winding current of a shape appropriate to achievement of the desired output winding impedance variations.

A resistor 38, connected between the B+ terminal and the junction of capacitor 31 and winding 33, provides a path for supplying to input winding 33 a direct current of a magnitude suitable for biasing the reactor 34 to an appropriate region of its magnetization characteristic.

It will be noted that the present invention provides advantages of economy and reliability in the manufacturing of color television receivers by permitting side pincushion correction to be effected by a circuit arrangement with a relatively small parts count, with reliance for drive voltage development placed on circuit elements desirably already present in the receiver for performance of other deflection circuit functions.

I claim:
1. In a television receiver including a deflection yoke having horizontal deflection windings and vertical deflection windings, said vertical deflection windings having a high potential terminal and a low potential terminal; means for supplying line rate sawtooth current waves to said horizontal deflection windings; and a saturable reactor having an input winding and presenting an impedance to said supplying means which is subject to variation in accordance with variations in current flow in said input winding; apparatus comprising:

a vertical deflection wave generator;
means, responsive to field rate deflection waves developed by said generator for energizing said vertical deflection windings with a field rate deflection current of substantially sawtooth waveshape; said energizing means including;
(1) a first amplifier having first and second inputs and an output, said first input receiving said field rate deflection waves developed by said generator; and
(2) a deflection wave output amplifier having an input terminal coupled to receive amplified deflection waves appearing in said output of said first amplifier, an output terminal coupled to said high potential terminal of said vertical deflection windings, and a common terminal coupled to said low potential terminal of said vertical deflection windings by a current path consisting of the series combination of only a resistor and a capacitor across which appears a composite voltage corresponding to the sum of a field rate sawtooth voltage wave component and a field rate parabolic voltage wave component;
a feedback path coupled between said low potential terminal of said vertical deflection windings and said first amplifier for applying said composite voltage to said second input of said first amplifier; and
means for utilizing said composite voltage developed across said series combination to control the flow of current in said input winding.

2. Apparatus in accordance with claim 1, wherein said resistor and said capacitor are serially connected, in the order named, between said low potential terminal of said vertical deflection windings and said common terminal.

3. Apparatus in accordance with claim 2 also including;
a supply terminal;
a source of unidirectional potential coupled between said supply terminal and said common terminal;
a second resistor;
a second capacitor, said second resistor and said second capacitor being serially connected, in the order named, between said supply terminal and the junction of said first-named resistor and said first-named capacitor, to cause development of a filtered unidirectional potential across the series combination of said second capacitor and said first-named capacitor;
means for utilizing said filtered unidirectional potential as operating potential for said output amplifier.

4. Apparatus in accordance with claim 3 also including:
means for utilizing the potential appearing across the first-named capacitor as operating potential for said generator and said first amplifier.

5. Apparatus in accordance with claim 4 wherein said voltage utilizing means comprises means, including a third, DC blocking capacitor, for coupling said input winding across said series combination of said first-named resistor and said first-named capacitor.

6. Apparatus in accordance with claim 5 also including means, independent of said first-named capacitor, for supplying unidirectional biasing current to said input winding.

* * * * *